(12) United States Patent
Cho et al.

(10) Patent No.: US 7,188,391 B2
(45) Date of Patent: Mar. 13, 2007

(54) HINGE ASSEMBLY FOR FLAT PANEL DISPLAY APPLIANCE

(75) Inventors: Gyu Yeol Cho, Gyengsangbuk-Do (KR); Hong Ki Kim, Daegu (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 10/488,869

(22) PCT Filed: Oct. 21, 2002

(86) PCT No.: PCT/KR02/01963

§ 371 (c)(1),
(2), (4) Date: Mar. 8, 2004

(87) PCT Pub. No.: WO03/062970

PCT Pub. Date: Jul. 31, 2003

(65) Prior Publication Data
US 2004/0250381 A1   Dec. 16, 2004

(30) Foreign Application Priority Data
Dec. 24, 2001 (KR) ................ 2001-84044
Dec. 24, 2001 (KR) ................ 2001-84046

(51) Int. Cl.
*E05D 11/08* (2006.01)
*E05D 11/10* (2006.01)
(52) U.S. Cl. .......................... 16/340; 16/342
(58) Field of Classification Search ............. 16/340, 16/342, 337, 338, 234, 240, 273, 277, 343, 16/344, 375, 382; 403/118–120; 361/680–683, 361/801–804; 379/433.11–13, 434, 433, 379/428; 455/90, 550, 556, 575
See application file for complete search history.

(56) References Cited

U.S. PATENT DOCUMENTS

| 2,736,027 A |   | 2/1956 | Parmelee |
| 3,384,334 A |   | 5/1968 | Malachowski |
| 5,008,978 A |   | 4/1991 | Waeber et al. |
| 5,022,778 A |   | 6/1991 | Lu |
| 5,109,570 A | * | 5/1992 | Okada et al. .......... 16/289 |

(Continued)

FOREIGN PATENT DOCUMENTS

KR      2000-25108      5/2000

*Primary Examiner*—Robert J. Sandy
*Assistant Examiner*—Andre' L. Jackson
(74) *Attorney, Agent, or Firm*—Ked & Associates, LLP

(57) ABSTRACT

Disclosed is a hinge assembly capable of adjusting a tilting angle of a display in a display appliance. The hinge assembly includes a movable plate fixed to a rear side of the display and having a through-hole, a stationary plate coupled to a stand for the display appliance and having a through-hole, a hinge shaft passing through the through-holes of the movable and stationary plates and having a head portion, a coupling member fixed to one end of the hinge shaft, a first washer disposed between the head portion of the hinge shaft and the movable plate, first and secondary washers disposed at both sides of the through-hole of the movable plate, and third and fourth stationary washers disposed at both sides of the through-hole of the stationary plate. At least one of the first, second, third and fourth stationary washes is an elastic washer for applying compressive elasticity to the hinge shaft in an axial direction.

3 Claims, 9 Drawing Sheets

U.S. PATENT DOCUMENTS

| | | | |
|---|---|---|---|
| 5,208,944 A | 5/1993 | Lu | 16/278 |
| 5,239,731 A | 8/1993 | Lu | |
| 5,269,047 A | 12/1993 | Lu | |
| 5,702,197 A | 12/1997 | Chen | 403/166 |
| 5,772,351 A | 6/1998 | Ching | |
| 5,894,633 A * | 4/1999 | Kaneko | 16/306 |
| 5,913,351 A | 6/1999 | Miura | |
| 5,937,482 A * | 8/1999 | Horng | 16/340 |
| 5,940,936 A * | 8/1999 | Lu | 16/337 |
| 5,970,580 A * | 10/1999 | Katoh | 16/337 |
| 6,038,739 A | 3/2000 | Katoh | |
| 6,081,969 A * | 7/2000 | Tanahashi et al. | 16/337 |
| 6,145,797 A * | 11/2000 | Uehara | 248/291.1 |
| 6,154,925 A | 12/2000 | Miura | 16/338 |
| 6,163,928 A * | 12/2000 | Chung | 16/342 |
| 6,168,342 B1 | 1/2001 | Wu | |
| 6,421,878 B1 * | 7/2002 | Kaneko et al. | 16/330 |
| 6,427,288 B1 | 8/2002 | Saito | |
| 6,430,777 B1 | 8/2002 | Lu | |
| 6,453,509 B1 * | 9/2002 | Shin | 16/340 |
| 6,539,582 B1 * | 4/2003 | Chae | 16/340 |
| 6,568,034 B2 * | 5/2003 | Cho | 16/337 |
| 6,581,893 B1 * | 6/2003 | Lu | 248/291.1 |
| 6,666,422 B1 | 12/2003 | Lu | |
| 6,671,928 B2 * | 1/2004 | Huang | 16/340 |
| 6,698,063 B2 * | 3/2004 | Kim et al. | 16/337 |
| 6,813,813 B2 * | 11/2004 | Lu et al. | 16/342 |
| 2003/0140456 A1 * | 7/2003 | Hsieh et al. | 16/340 |
| 2004/0055114 A1 * | 3/2004 | Lu | 16/340 |

* cited by examiner

HINGE ASSEMBLY FOR FLAT PANEL DISPLAY APPLIANCE

TECHNICAL FIELD

The present invention relates to a hinge assembly capable of adjusting a tilting angle of a display in a flat panel display appliance, and more particularly, to a hinge assembly adapted to be easily assembled using a common bolt as a hinge shaft of a rotation around which a display is pivoted, without separately machining the hinge shaft.

BACKGROUND ART

Generally, a hinge assembly for a display appliance used in a personal computer includes, as shown in FIG. 1, an L-shaped mounting plate 3 having a vertical portion 3b formed with a hinge shaft receiving hole and a horizontal portion 3c at one side secured to a casing body of the display appliance; and a hinge shaft 1 having a mounting portion 1a secured to an upper cover of a casing of the display appliance, an extended portion 1c at the other side pivotally inserted into the hinge shaft receiving hole of the mounting plate 3, and a flange 1b between the mounting portion and the extended portion. The extended portion 1c has at a free end thereof a faceted portion 1c' with a threaded portion formed thereon.

The hinge assembly also includes washers 2a and 2b disposed at both ends of the mounting plate, an axially biased resilience washer 4, a sleeve member 5 contacted with the resilience washer 4, a torsion spring 6, a washer 7 restricting a pivoting range and having a stopper boss 7a, and a nut 8.

The sleeve member 5 has a flange portion 5a contacted with the resilience washers 4 and a tubular portion 5b receiving the torsion spring 6 therein. The torsion spring has one bent end 6a inserted into a hole 3a formed at the vertical portion 3b of the mounting plate, and the other end supported by the stopper boss 7a of the washer 7.

The pivot range restricting washer 7 is formed with a hole having a shape corresponding to that of the faceted portion 1c' of the extended portion 1c. Since the faceted portion 1c' is inserted into the hole, when the hinge shaft is pivoted in one direction, the pivot range is restricted until the braking boss 7a reaches to the end 6a of the torsion spring 6. When the hinge shaft is pivoted in the counter direction, the washer 7 is applied with elasticity against the pivoting operating, since the braking boss 7a is stopped by the other end of the torsion spring.

Since the hinge assembly as described above requires the specially faceted hinge shaft, the hinge shaft has to be machined through a faceting process including milling and turning during the manufacturing of the hinge assembly, thereby increasing the manufacturing cost. In addition, separate components corresponding to the shape of the faceted hinge shaft must be manufactured, thereby complicating the design of the hinge assembly and making difficult to assemble the hinge. Furthermore, there is another problem in that the relatively soft plate of the components of the hinge assembly can be easily worn by the rotation of the hinge shaft.

DISCLOSURE OF THE INVENTION

Therefore, an object of the present invention is to solve the problems involved in the prior art, and to provide a hinge assembly adapted to be easily assembled using a common bolt without separately machining a hinge shaft of a basic axis around which a display is pivoted.

Another object of the present invention is to provide a hinge assembly in which stationary and movable plates are not worn during rotation.

Another object of the present invention is to provide a hinge assembly capable of adjusting a tilting angle of a display without using a separate component assembled which is a faceted hinge shaft so as to restrict a pivoting range of the hinge shaft.

Another object of the present invention is to provide a pivot assembly which has excellent pivotable performance and is capable of being easily assembled and reducing the manufacturing cost thereof.

In order to accomplish the above mentioned objects, the present invention provides a hinge assembly for adjusting a tilting angle of a display for a flat panel display appliance, comprising: a movable plate fixed to a rear side of the display and having a through-hole; a stationary plate coupled to a stand of the display and having a through-hole; a hinge shaft passed through the through-holes of the movable and stationary plates and having a head portion; a coupling member fixed to one end of the hinge shaft; a first washer disposed between the head portion of the hinge shaft and the movable plate; first and second stationary washers disposed at both sides of the through-hole of the movable plate; and third and fourth stationary washers disposed at both sides of the through-hole of the stationary plate; wherein at least one of the first, second, third and fourth stationary washes is an elastic washer for applying compressive elasticity to the hinge shaft in an axial direction.

According to one preferred embodiment of the present invention, the through-hole of the stationary plate is opened at an upper portion thereof.

According to one preferred embodiment of the present invention, the movable plate has a bent boss at an upper end of the through-hole, and the stationary plate has a pivot guide at an upper end of the through-hole, the bent boss of the movable plate moving along a passage pivoting about the hinge shaft.

According to one preferred embodiment of the present invention, the movable plate has a latching groove formed at a portion parallel to the hinge shaft, and a coil spring with one end fixed to the latching groove of the movable plate and the other end inserted into a fixing hole formed at the stationary plate, the coil spring applying a resistant force against a pivoting direction of the movable plate relative to the stationary plate around the hinge shaft.

According to one preferred embodiment of the present invention, the first, second, third and fourth stationary washers have at least one fixing boss, and the movable and stationary plates are formed with a fixing hole adjacent the through-hole thereof for receiving the fixing boss of the stationary washer.

According to one preferred embodiment of the present invention, any one of the third and fourth stationary washers has an upper fixing boss of a width slightly smaller than that of the opened portion of the through-hole of the stationary plate, and the fixing hole of the stationary plate for receiving the upper fixing boss is the opened portion of the through-hole.

According to one preferred embodiment of the present invention, the hinge shaft has an axially extended portion with a threaded portion formed thereon, and a head portion larger in diameter than the extended portion.

According to one preferred embodiment of the present invention, the hinge shaft is a commonly used bolt.

According to one preferred embodiment of the present invention, the coupling member is a nut.

According to one preferred embodiment of the present invention, the first washer is a flat washer.

According to one preferred embodiment of the present invention, the first washer has an oil impregnating groove for preventing wear of a contacted portion between the washers and an adjacent component and for securing smooth pivoting movement.

According to one preferred embodiment of the present invention, at least one of the stationary washers has an oil impregnating groove for preventing wear of a contacted portion between the washers and an adjacent component and for securing smooth pivoting movement.

According to one preferred embodiment of the present invention, the elastic washer is a hemispheric washer having a fixing boss fixed to the plate.

According to one preferred embodiment of the present invention, the elastic washer is a stationary washer fixed to the stationary plate and disposed adjacent to the coupling member, and the coupling member is a washer-type nut.

It is to be understood that both the foregoing general description and the following detailed description of the present invention are exemplary and explanatory and are intended to provide further explanation of the present invention as claimed.

BRIEF DESCRIPTION OF THE DRAWINGS

The above objects, other features and advantages of the present invention will become more apparent by describing the preferred embodiment thereof with reference to the accompanying drawings, in which.

BEST MODE FOR CARRYING OUT THE INVENTION

Figure 1:
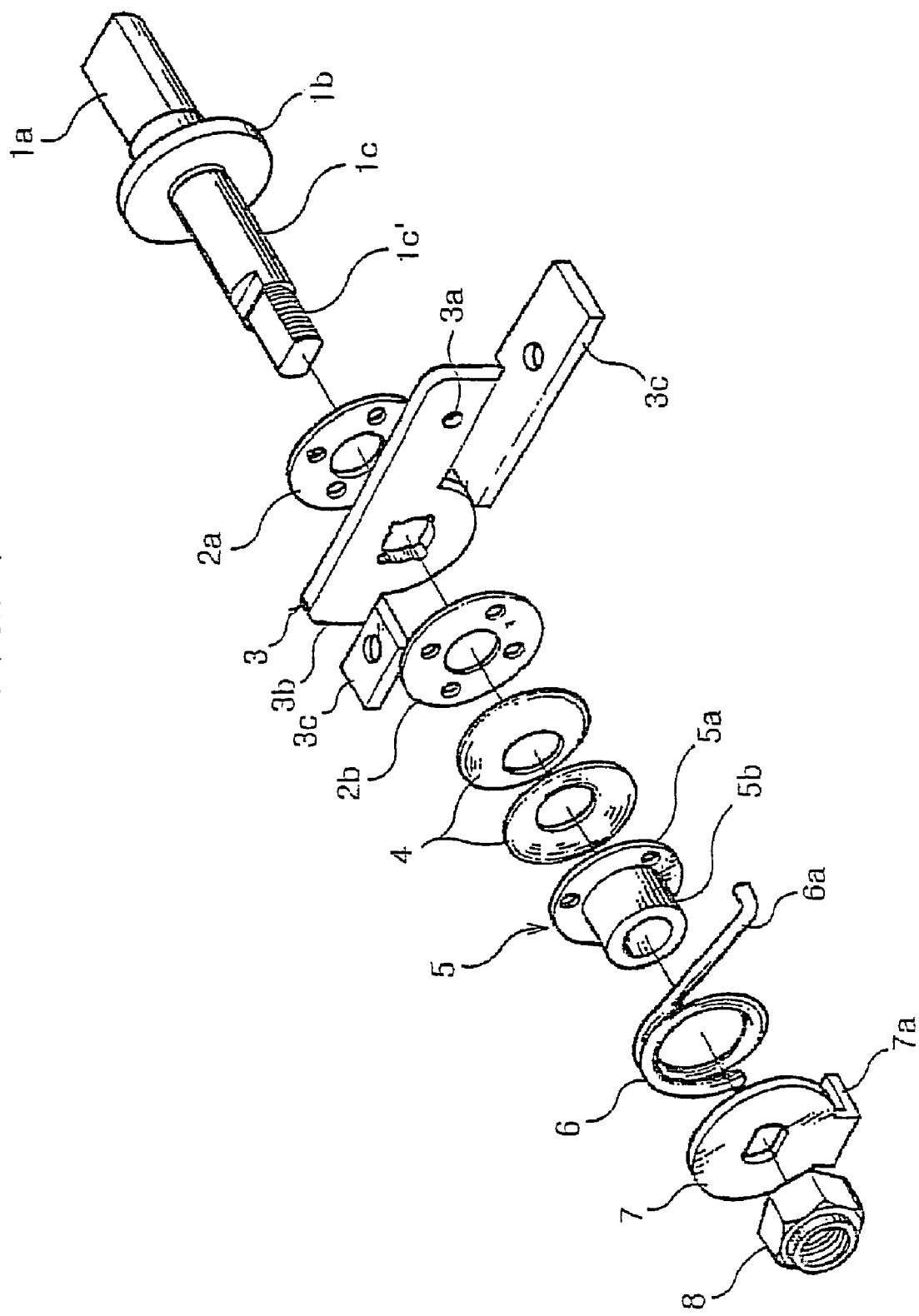
FIG. 1 is an exploded view showing a conventional hinge assembly for a flat panel display appliance.

Reference will now be made in detail to the preferred embodiments of the present invention; examples of which are illustrated in the accompanying drawings. In the embodiments, like parts are shown by corresponding reference numerals throughout the drawings, and additive explanation thereof will be omitted.

Figure 2:
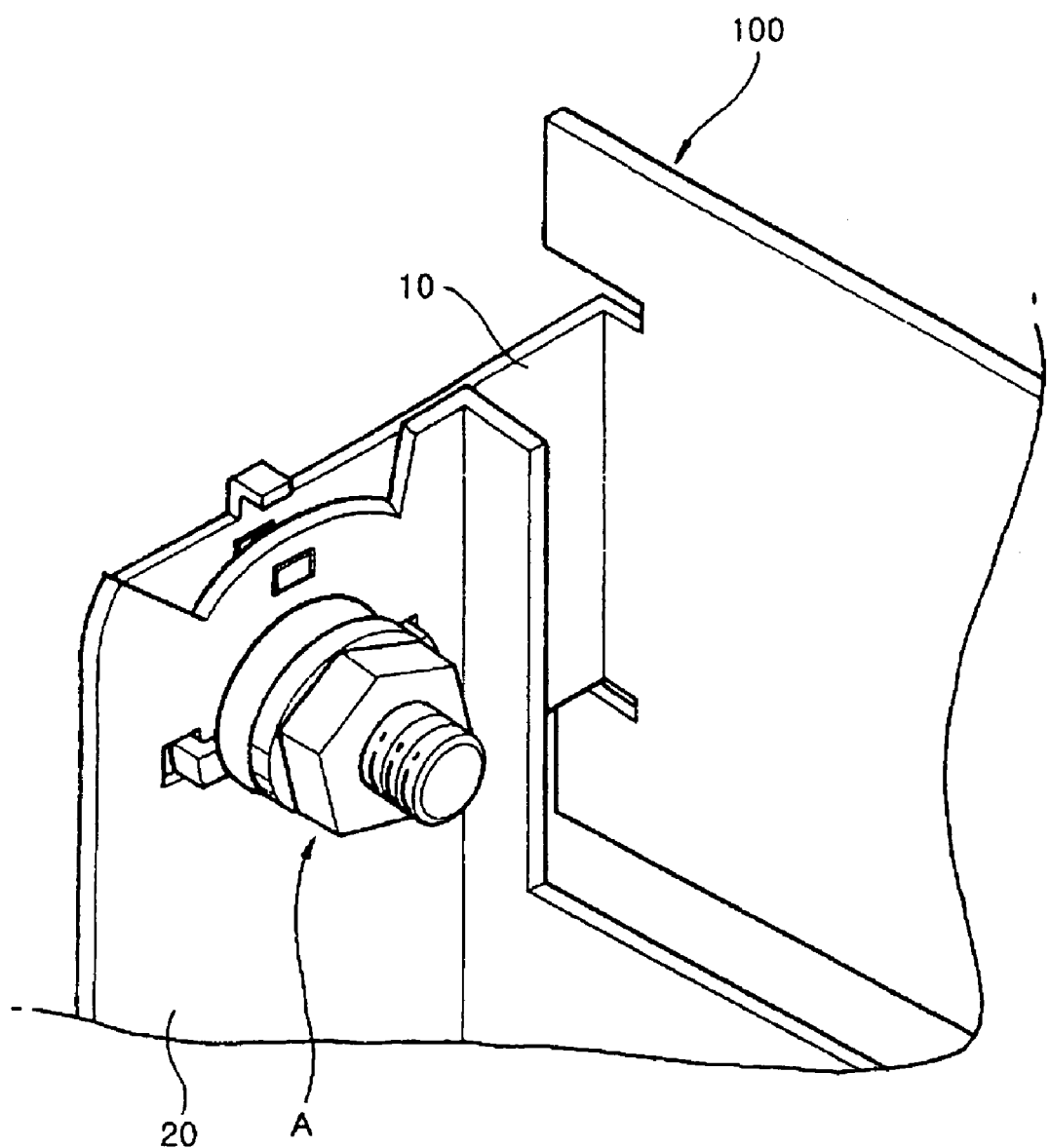
FIG. 2 is a perspective view of a hinge assembly for a flat panel display appliance according to one preferred embodiment of the present invention.

FIG. 2 shows a perspective view illustrating the assembled state of a hinge assembly for a flat panel display appliance according to one preferred embodiment of the present invention, in which a coil spring is eliminated. FIG. 2 shows only one side of the hinge assembly. Even though the hinge assembly of the present invention may be installed at one side of the flat panel display appliance, as shown in FIG. 2, it is possible to adjust the tilting angle of the display of the flat panel display, without installing another hinge assembly having the same construction as the hinge assembly.

As shown in FIG. 2, the hinge assembly 100 of the present invention includes a hinge member A having a movable plate 10 fixed to a rear side of a display of a flat panel display appliance for securing the hinge member A, and a stationary plate 20 coupled to a stand supporting the display against a certain bottom and disposed adjacent to the movable plate to cause the movable plate to be rotated. The term "movable" in the movable plate means that the movable plate can be rotated relative to the stationary plate. The term "stationary" in the stationary plate is an expression having a meaning relative to the term "movable" used in the movable plate. "Stationary" means that the stationary plate functions as a reference point when the movable plate rotates around the hinge shaft.

The rotation between the movable and stationary plates is performed by rotating the movable plate relative to the stationary plate around the hinge member coupled to the movable and stationary plates, since the stationary plate coupled to the stand for the display forms a fixed supporting point. The tilting angle of the display can be adjusted by the relative rotation. As will be described hereinafter, since the hinge member coupled to the movable and stationary plates is applied with compressive resilience in an axial direction from the resilient washer, the movable and stationary plates are closely contacted to each other, and thus the rotated position of the hinge member is maintained, even upon the relative rotation of the plates.

Figure 3:
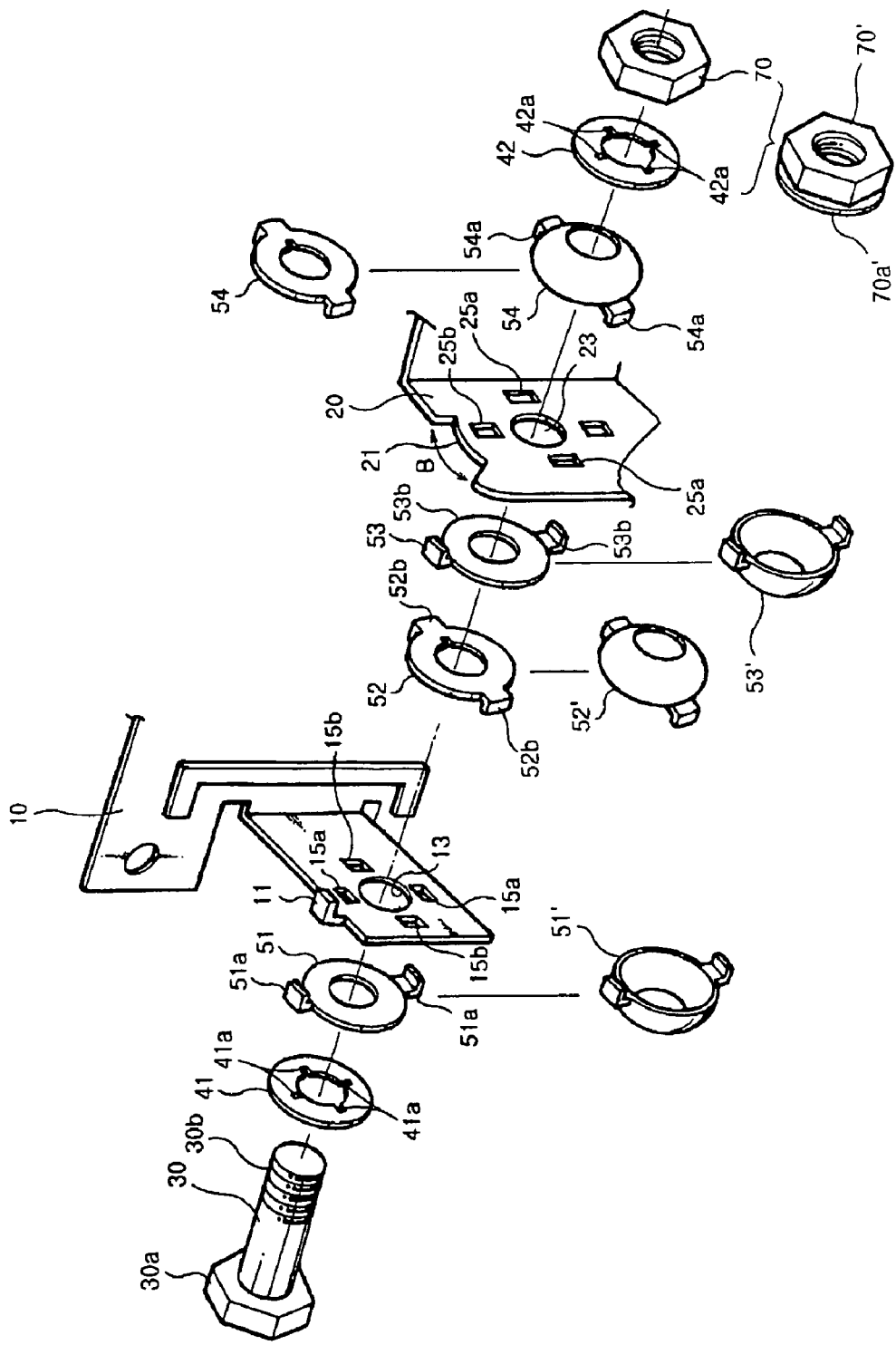
FIG. 3 is an exploded view of the hinge assembly of FIG. 2.

FIG. 3 is an exploded perspective view of the hinge assembly according to the present invention. As shown in FIG. 3, the movable plate 10 secured to the rear side of the display of the flat panel display appliance includes a horizontal portion arranged parallel to the rear side of the display and a vertical portion arranged vertical to the horizontal portion and having a through-hole 13 through which a hinge shaft is passed.

The stationary plate 20 coupled to the stand for the display includes a vertical portion arranged parallel to the vertical portion of the movable plate, and the vertical portion of the stationary plate has a through-hole 23 through which the hinge shaft is passed.

In order to restrict the rotating range of the movable plate when the movable plate rotates relative to the stationary plate around the hinge shaft 30, the vertical portion of the movable plate 10 has a bent stopper boss 11 upwards of the through-hole 13. Also, the stationary plate 20 may be provided with an arch stopper member 21 above the through-hole 23 for restricting a pivoting range B of the movable plate cooperating with the bent stopper boss 11 of the movable plate 10. An arched stopper member is provided along a pivoting radius of the bent stopper boss of the movable plate rotated relative to the stationary plate 20 around the hinge shaft.

The hinge shaft 30 using common bolt is inserted into the through-holes of the movable and stationary plates, and a nut 70 is fastened to the threaded portion formed at one end of the hinge shaft, thereby completing the assembly of the hinge member. The hinge shaft has a head portion and a cylindrical engaging portion having a diameter smaller than that of the head portion. The engaging portion has a threaded portion formed at one end thereof, and a nut is fastened to the threaded portion.

The hinge shaft of the hinge member utilizes a common bolt comprising a hexagonal head portion 30a and a threaded portion 30b, so that a faceting process including milling and turning required during the manufacturing of a conventional hinge assembly may be eliminated, thereby allowing for easy manufacturing of the hinge assembly which in turn decreases the manufacturing costs.

First and second washers 41 and 42 are interposed between the head portion of the hinge shaft and the movable plate 10, and between the stationary plate 20 and the nut 70, respectively, so as to secure the close fastening between the contacted components, to increase frictional force and to decrease the wear of the contacted components. The first and second washers 41 and 42 may be flat washers, and have oil impregnating grooves 41a and 42a. These oil impregnating grooves may be formed at anyplace of a portion where a certain component becomes in frictional contact with another component, besides the first and second washers.

As described above, the rotation of the movable plate relative to the stationary plate causes the contacted portion to be considerably worn out. Accordingly, in order to solve the above problem, first and second stationary washers 51 and 52 are disposed at both sides of the through-hole of the movable plate, and third and fourth washers 53 and 54 are disposed at both ends of the through-holes of the stationary plate. These washers also serve as a function of fixedly securing the hinge shaft to the through-holes of the movable and stationary plates.

In order to fixedly engage the first and second stationary washers 51 and 52 to the movable plate 10, the first and second stationary washers 51 and 52 have bent bosses 51a and 52b formed along a circumference of the respective washers, and the movable plate is formed with fixing holes 15a and 15b for receiving the bent bosses 51a and 52b adjacent to the through-hole 13. If the bent bosses and the fixing holes correspond to each other, the number and position thereof may be easily altered.

In order to fixedly engage the third and fourth stationary washers 53 and 54 to the stationary plate 20, the third and fourth stationary washers 53 and 54 have bent bosses 53a and 54a formed along a circumference of the respective washers, and the stationary plate is formed with fixing holes 25a and 25b for receiving the bent bosses 53a and 54a adjacent to the through-hole 23. If the bent bosses and the fixing holes correspond to each other, the number and position thereof may be easily altered. As the same reason, two stationary washers fixedly secured to both sides of any one of plates may be opposed to each other.

Any one of the stationary washers 51, 52, 53 and 54 also serves as an elastic washer for applying axially compressive elasticity to the hinge assembly. The stationary washer is of a hemispheric or disc shape, and is biased in the direction of the hinge shaft by the fastening force of the nut to securely maintain the engagement of the hinge member.

According to the embodiment of the present invention, the elastic washer is applied to the fourth stationary washer 54, but any one of the first, second and third stationary washers 51, 52 and 53 may be replaced by an elastic washer 51', 52', or 53' having a function of applying compressive elasticity to the hinge assembly in the axial direction. If the fourth stationary washer 54 is applied as the elastic washer, the second washer 42 and the nut 70 positioned behind the fourth stationary washer 54 may be replaced by an integrated washer-type nut 70'. The second flat washer 42 is no further required by utilizing the washer-type nut 70' having a washer portion 70a', thereby reducing the number of components.

Figure 4:
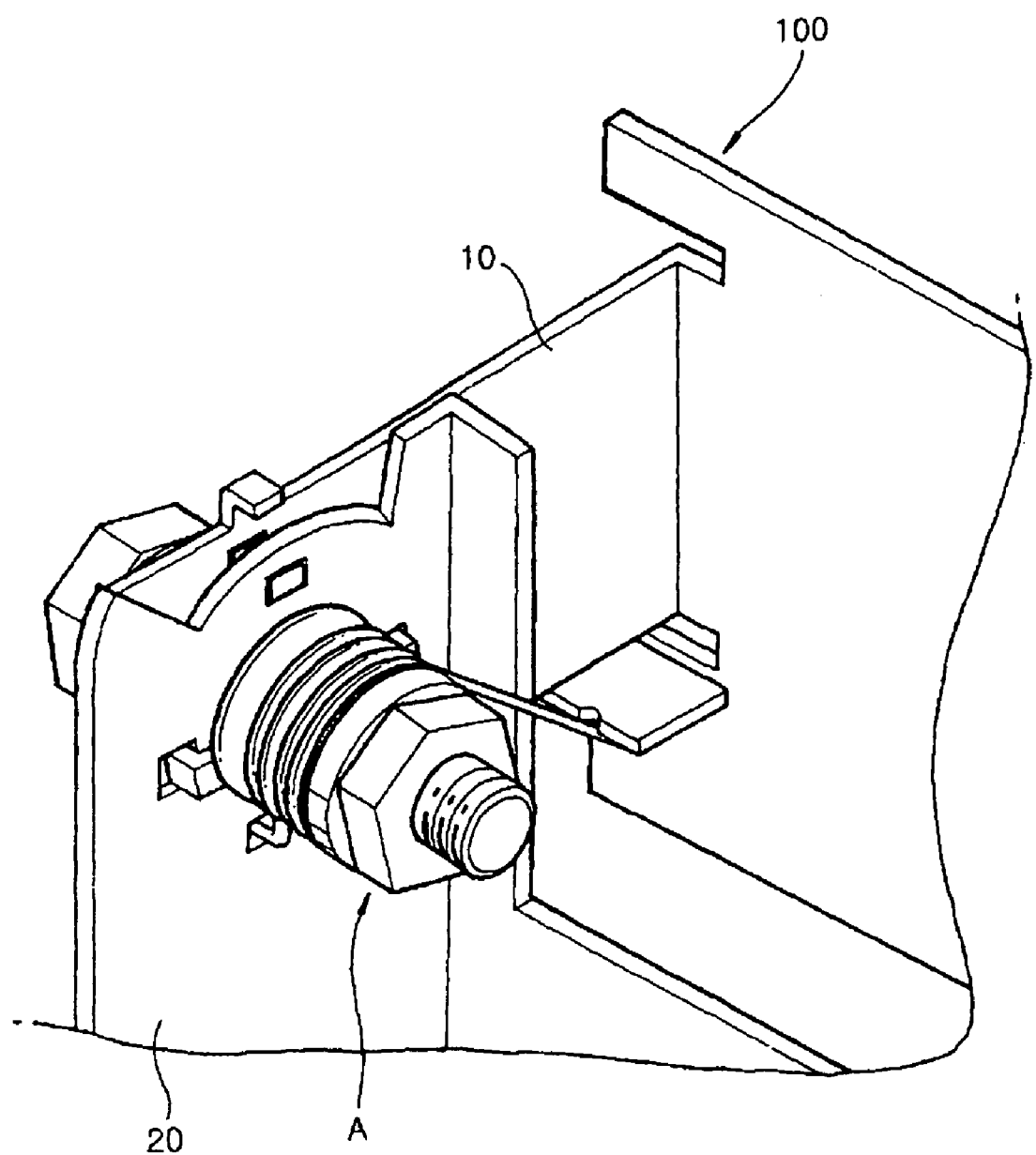
FIG. 4 is a perspective view of a hinge assembly according to another preferred embodiment of the present invention, in which a coil spring is installed.
Figure 5:
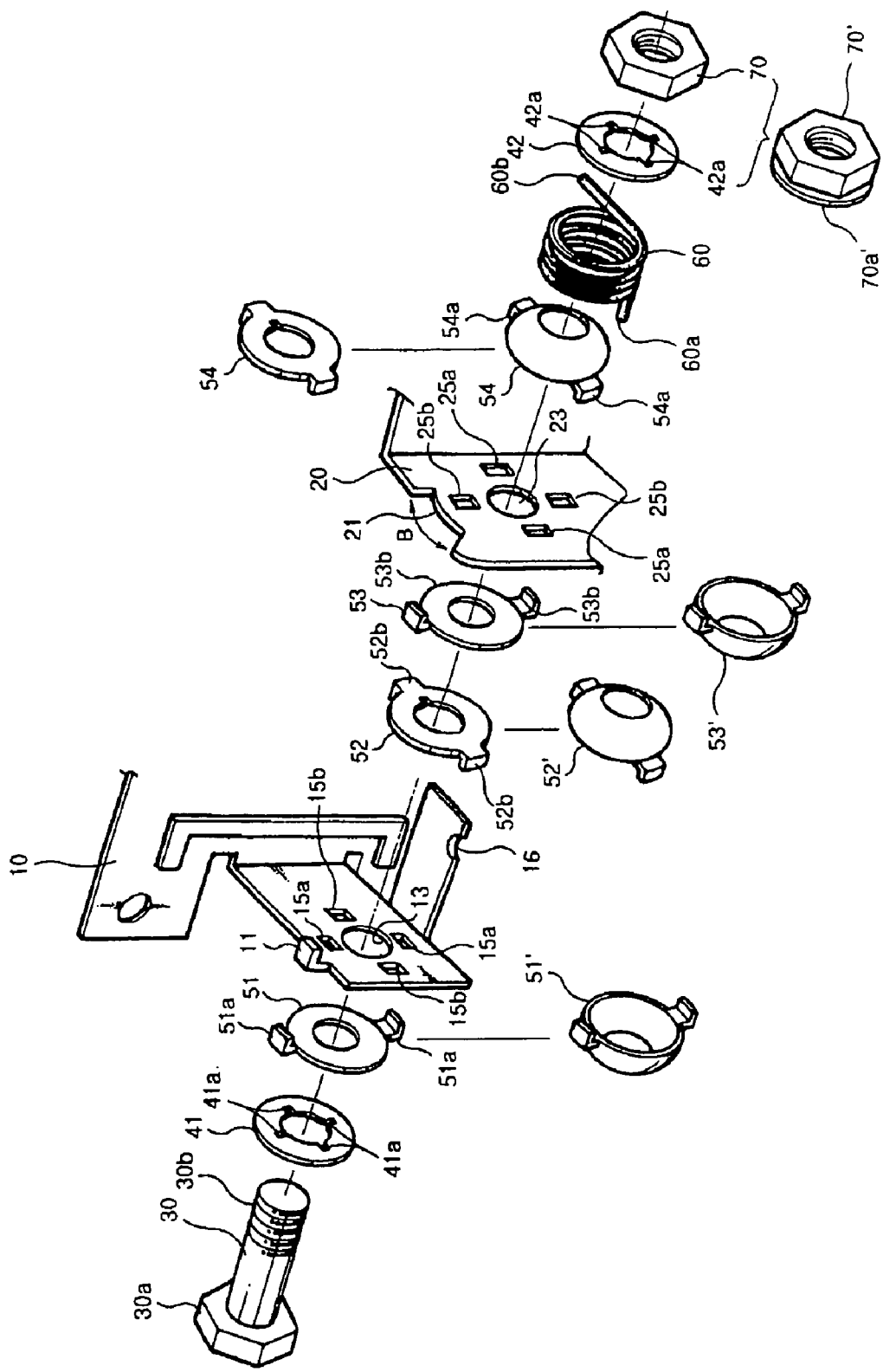
FIG. 5 is an exploded view of the hinge assembly of FIG. 4.

FIG. 4 shows a perspective view illustrating a hinge assembly for a flat panel display appliance according to another preferred embodiment of the present invention, in which a coil spring is installed. FIG. 5 is an exploded view of the hinge assembly shown in FIG. 4. As shown in FIGS. 4 and 5, the hinge assembly may include a coil spring member 60 for adjusting the tilting angle of a large-size display in the direction of the nut 70 from the stationary plate 20. In the case of a heavy and big display, since the hinge assembly is not securely positioned against the movable and stationary plates only by the fastening force of the nut and the compressive resilience of the elastic washer, the heavy display may be effectively supported by applying a resistive force in the pivot direction using the spring member, when the movable plate rotates relative to the stationary plate (i.e., adjusting the tilting angle of the display).

In order to install the coil spring member 60, the movable plate 10 has a latching groove 16 formed at the horizontal portion parallel to the hinge shaft and receiving one end 60b of the coil spring member 60. The other end 60a of the coil spring member 60 is inserted into a fixing hole 25b formed at the stationary plate. At that time, the fixing hole 25b of the stationary plate is also intended to receive the bent boss of the stationary washer.

According to an alternative embodiment of the present invention, the through-hole of the stationary plate may be replaced with an opened through-hole so as to easily assemble the hinge assembly. In this case, the hinge assembly may be installed through the opened portion of the stationary plate, thereby allowing easy assembly of the hinge assembly.

The hinge assembly employing the stationary plate with the opened through-hole is shown in detail in FIGS. 6 to 9.

Figure 6:
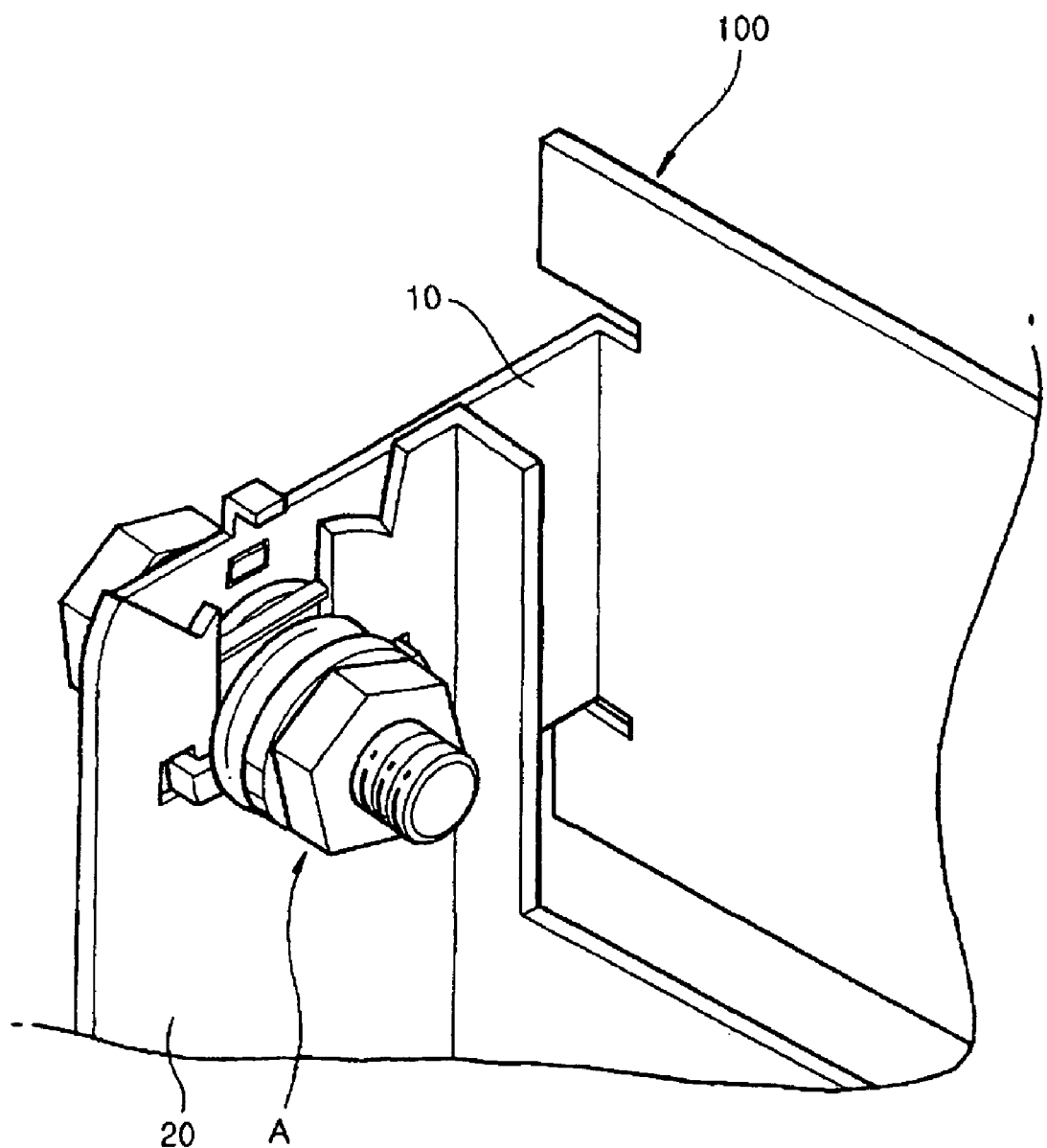
FIG. 6 is a perspective view of a hinge assembly according to another preferred embodiment of the present invention, in which a stationary plate having a through-hole of which an upper portion is opened is employed.
Figure 7:
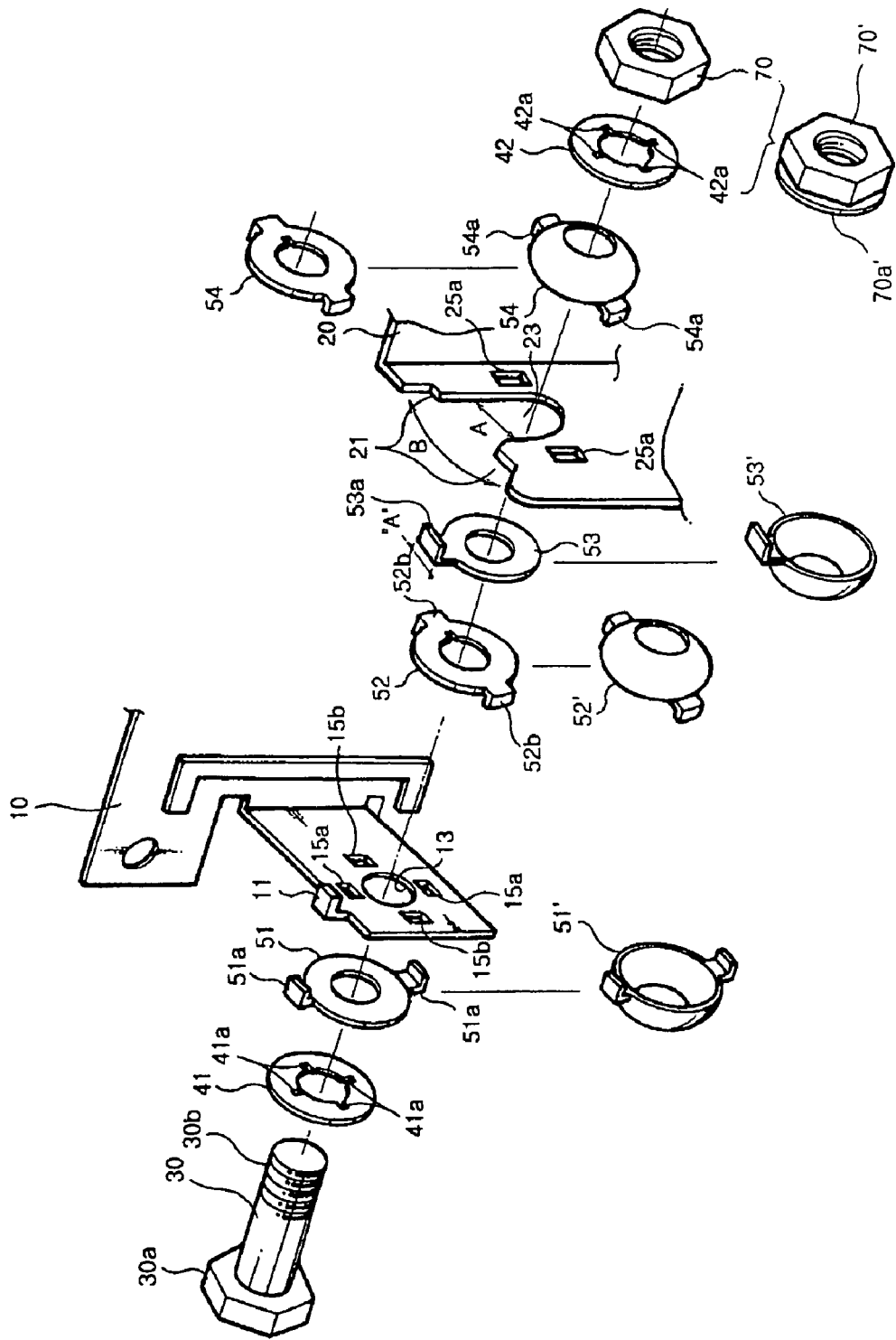
FIG. 7 is an exploded view of the hinge assembly of FIG. 6.

FIGS. 6 and 7 are perspective and exploded views illustrating the hinge assembly for a flat panel display appliance, in which a coil spring is eliminated. As shown in FIGS. 6 and 7, the hinge assembly 100 of the present invention includes a hinge member A, a movable plate 10 fixed to a rear side of a display of the flat panel display appliance for securing the hinge member A, and a stationary plate 20 coupled to a stand supporting the display appliance against a certain bottom and disposed adjacent to the movable plate to cause the movable plate to be rotated.

The movable plate 10 secured to the rear side of the display of the flat panel display appliance includes a horizontal portion arranged parallel to the rear side of the display and a vertical portion arranged vertical to the horizontal portion and having a through-hole 13 through which the hinge shaft is passed.

The stationary plate 20 coupled to the stand of the display appliance includes a vertical portion parallel to the vertical portion of the movable plate. The vertical portion has a through-hole 23 of which an upper portion is opened and which receives the hinge shaft 30 through the opened portion. Generally, when assembling the hinge assembly, since the hinge shaft is mounted to the movable plate and then the stationary plate is installed, the stationary plate can be easily installed from the bottom of the hinge shaft, in the state the hinge shaft is inserted into the movable plate. Specifically, it is easy to secure the mounting space sufficient to install components of the hinge assembly upon the installation, thereby allowing for convenient installation of the hinge assembly.

In order to restrict the rotating range of the movable plate when the movable plate rotates relative to the stationary plate around the hinge shaft 30, the vertical portion of the movable plate 10 is formed with a bent stopper boss 11 upwards the through-hole 13. Also, the stationary plate 20 may be provided with a partially arch stopper member 21 above the opened through-hole 23 for restricting a pivoting range B of the movable plate cooperating with the bent stopper boss 11 of the movable plate. The partially arch portion is provided along a pivoting radius of the bent stopper boss of the movable plate rotated relative to the stationary plate 20 around the hinge shaft.

As described above, since the movable plate 10 rotates relative to the stationary plate 20, one portion of the hinge member securely engaged to the movable and stationary plates severely wears. In order to prevent the above wear, first and second stationary washers 51 and 52 are disposed at both sides of the through-hole of the movable plate, and third and fourth stationary washers 53 and 54 are disposed at both sides of the through-hole of the stationary plate.

Any one of stationary washers, in particular, the third and fourth stationary washers 53 and 54 also serve as an axially fixing washer for firmly fixing the hinge assembly which is coupled to the stationary plate to the through-hole 23 of the stationary plate 20, as well as serving as the function of preventing the wear of the plate. The term "axially fixing washer" is a functional expression indicative of fixing the hinge member to the stationary plate.

In order to fixedly engage the first and second stationary washers 51 and 52 to the movable plate 10, the first and second stationary washers 51 and 52 have bent bosses 51a and 52b formed along a circumference of the respective washers, and the movable plate is formed with fixing holes 15a and 15b for receiving the bent bosses 51a and 52b adjacent to the through-hole 13. If the bent bosses and the fixing holes correspond to each other, the number and position thereof may be easily altered.

In order to fixedly engage the third and fourth stationary washers 53 and 54 to the stationary plate 20, the third and fourth stationary washers 53 and 54 have bent bosses 53a and. 54a formed along a circumference of the respective washers, and the stationary plate is formed with fixing holes 25a and 25b for receiving the bent bosses 53a and 54a adjacent to the through-hole 23. According to the shown embodiment of the present invention, the third stationary washer 53 has one bent boss 53a at an upper portion thereof, and the bent boss is adapted to insert into the opened portion of the through-hole 23. A width "A" of the bent portion of the bent portion 53a almost corresponds to that of the opened portion of the through-hole 23 of the second plate.

The third stationary washer 53 may further include a bent boss (not shown) fixedly engaged to a lower fixing hole 25b of the second plate. If the bent bosses and the fixing holes correspond to each other, the number and position thereof may be easily altered. As the same reason, two stationary washers fixedly secured to both sides of any one of plates may be opposed to each other.

At least one of the stationary washers 51, 52, 53 and 54 also serves as an elastic washer for applying axially compressive elasticity to the hinge assembly. The stationary washer is of a hemispheric or disc shape, and is biased in the direction of the hinge shaft by the fastening force of the nut to securely maintain the engagement of the hinge member.

According to the embodiment of the present invention, the elastic washer is applied to the fourth stationary washer 54, but any one of the first, second and third stationary washers 51, 52 and 53 may be replaced by an elastic washer 51', 52', or 53' having a function of applying compressive elasticity to the hinge assembly in the axial direction.

If the fourth stationary washer 54 is applied as the elastic washer, the second washer 42 and the nut 70 positioned behind the fourth stationary washer 54 may be replaced by an integrated washer-type nut 70'. The second flat washer 42 is no further required by utilizing the washer-type nut 70' having a washer portion 70a', thereby reducing the number of components.

Components of the hinge assembly shown in FIGS. 6 and 7, but not described herein, have the same function as that described in the embodiment of FIGS. 2 and 3

Figure 8:
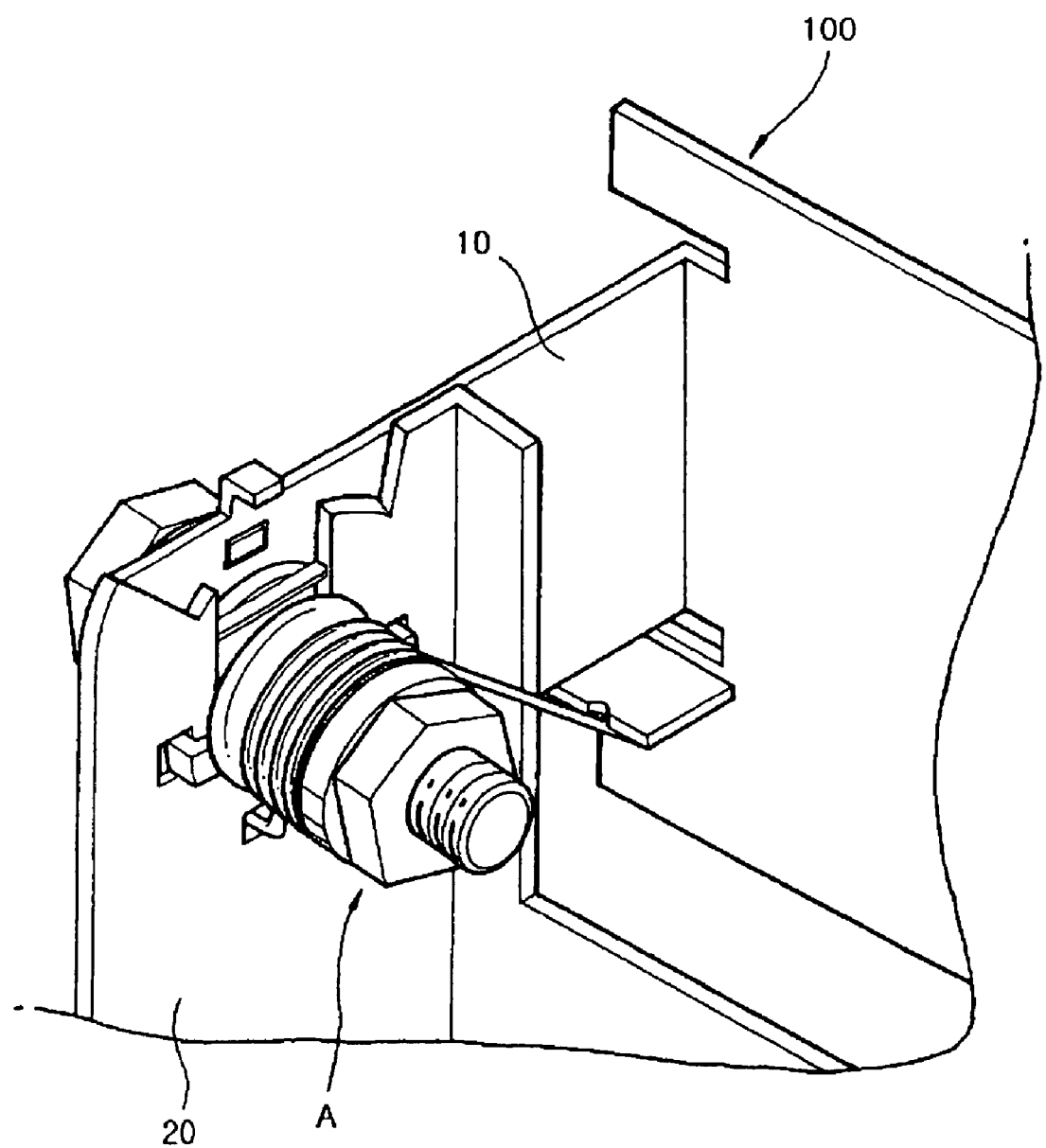
FIG. 8 is a perspective view of a hinge assembly according to another preferred embodiment of the present invention of FIG. 6, in which a coil spring is additionally installed.
Figure 9:
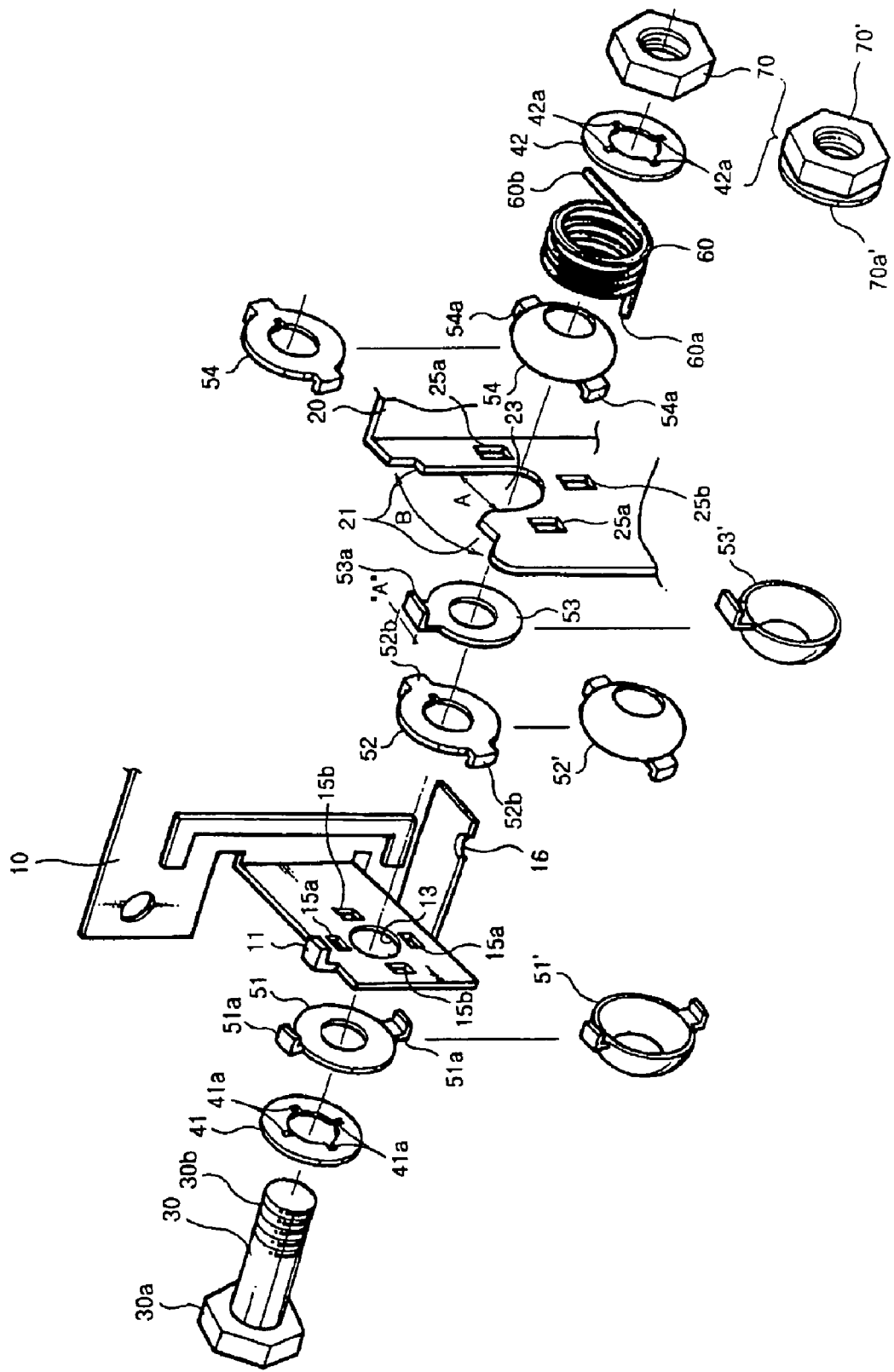
FIG. 9 is an exploded view of the hinge assembly of FIG. 8.

FIG. 8 shows a perspective view illustrating a hinge assembly for a flat panel display appliance according to another preferred embodiment of the present invention, in which a coil spring is installed. FIG. 9 is an exploded view of the hinge assembly shown in FIG. 8. The hinge assembly may include a coil spring member 60 for adjusting the tilting angle of a large-size display in the direction of the nut 70 from the stationary plate 20. In the case of a heavy and big display, since the hinge assembly is not securely positioned against the movable and stationary plates by the fastening force of the nut and the compressive resilience of the elastic washer, the heavy display may be effectively supported by applying a resistive force in the pivot direction, when the movable plate rotates relative to the stationary plate (i.e., adjusting the tilting angle of the display).

In order to install the coil spring member 60, the movable plate 10 has a latching groove 16 formed at the horizontal portion parallel to the hinge shaft and receiving one end 60b of the coil spring member 60. The other end 60a of the coil spring member 60 is inserted into the fixing hole 25b formed at the stationary plate. At that time, the fixing hole 25b of the stationary plate is also intended to receive the bent boss of the stationary washer or the axially fixing washer.

Components of the hinge assembly shown in FIGS. 8 and 9 but not described herein have the same function as that described in the embodiment of FIGS. 6 and 7

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers all modifications and variations of this invention that come within the scope of the appended claims and their equivalents.

INDUSTRIAL APPLICABILITY

With the above description, the present invention provides a hinge assembly adapted to be easily assembled using a common bolt, without separately machining a hinge shaft of a basic axis around which a display is pivoted. In addition, the hinge assembly is adapted so that the stationary and movable plates are not worn out when they rotate. Also, the hinge assembly can adjust the tilting angle of the display, without using a separate component assembled to the faceted hinge shaft so as to restrict the pivoting range of the hinge shaft. Furthermore, the present invention can provide a pivot assembly which has excellent pivotable performance capable of being easily assembled and reducing the manufacturing cost thereof.

The invention claimed is:

1. A hinge assembly for adjusting a tilting angle of a display for a flat panel display appliance, comprising:
   a movable plate fixed to a rear side of the display and having a through-hole;
   a stationary plate coupled to a stand for the display appliance and having a through-hole;
   a hinge shaft passing through the through-holes of the movable and stationary plates and having a head portion;
   a coupling member fixed to one end of the hinge shaft;
   a first washer disposed between the head portion of the hinge shaft and the movable plate;
   first and second stationary washers disposed at both sides of the through-hole of the movable plate; and
   third and fourth stationary washers disposed at both sides of the through-hole of the stationary plate, wherein at least one of the first, second, third and fourth stationary washers is an elastic washer for applying compressive elasticity to the hinge shaft in an axial direction and wherein the first, second, third and fourth stationary washers have at least one fixing boss, and the movable and stationary plates are formed with fixing holes adjacent the through-hole thereof for receiving the fixing bosses of the stationary washers.

2. A hinge assembly for adjusting a tilting angle of a display for a flat panel display appliance, comprising:
   a movable plate fixed to a rear side of the display and having a through-hole;
   a stationary plate coupled to a stand for the display appliance and having a through-hole;
   a hinge shaft passing through the through-holes of the movable and stationary plates and having a head portion;
   a coupling member fixed to one end of the hinge shaft;
   a first washer disposed between the head portion of the hinge shaft and the movable plate;
   first and second stationary washers disposed at both sides of the through-hole of the movable plate; and
   third and fourth stationary washers disposed at both sides of the through-hole of the stationary plate, wherein at least one of the first, second, third and fourth stationary washers is an elastic washer for applying compressive elasticity to the hinge shaft in an axial direction, and wherein the first washer is a flat washer, and wherein the first washer has an oil impregnating groove for preventing wear of a contacted portion between the washers and an adjacent component and for securing smooth pivoting movement.

3. A hinge assembly for adjusting a tilting angle of a display for a flat panel display appliance, comprising:
   a movable plate fixed to a rear side of the display and having a through-hole;
   a stationary plate coupled to a stand for the display appliance and having a through-hole;
   a hinge shaft passing through the through-holes of the movable and stationary plates and having a head portion;
   a coupling member fixed to one end of the hinge shaft;
   a first washer disposed between the head portion of the hinge shaft and the movable plate;
   first and second stationary washers disposed at both sides of the through-hole of the movable plate; and
   third and fourth stationary washers disposed at both sides of the through-hole of the stationary plate, wherein at least one of the first, second, third and fourth stationary washers is an elastic washer for applying compressive elasticity to the hinge shaft in an axial direction, wherein at least one of the stationary washers has an oil impregnating groove for preventing wear of a contacted portion between the washers and an adjacent component and for securing smooth pivoting movement.

* * * * *